United States Patent
Connell et al.

(10) Patent No.: US 7,465,099 B2
(45) Date of Patent: Dec. 16, 2008

(54) ROCKSHAFT LINER WITH THRUST SURFACE

(75) Inventors: Richard Joseph Connell, Slater, IA (US); Shawn Jeremy Becker, Ankeny, IA (US); Garrett Lee Goins, Ankeny, IA (US)

(73) Assignee: Deere & Company, Moline, IL (US)

( * ) Notice: Subject to any disclaimer, the term of this patent is extended or adjusted under 35 U.S.C. 154(b) by 406 days.

(21) Appl. No.: 11/361,376

(22) Filed: Feb. 24, 2006

(65) Prior Publication Data

US 2007/0201780 A1 Aug. 30, 2007

(51) Int. Cl.
*F16C 17/00* (2006.01)

(52) U.S. Cl. .................. 384/275; 384/296; 384/428

(58) Field of Classification Search .................. 384/275, 384/282, 295, 296, 298–300, 428–444
See application file for complete search history.

(56) References Cited

U.S. PATENT DOCUMENTS

| | | | | |
|---|---|---|---|---|
| 3,929,395 A | | 12/1975 | Stojek | 308/167 |
| 4,384,643 A | * | 5/1983 | Cone | 384/443 |
| 4,653,344 A | * | 3/1987 | Nelson | 384/295 |
| 4,704,038 A | * | 11/1987 | Bruchon, Jr. | 384/443 |
| 4,845,817 A | | 7/1989 | Wilgus | 29/149.5 |
| 4,989,998 A | | 2/1991 | Willis et al. | 384/275 |
| 5,114,246 A | | 5/1992 | Gowan | 384/275 |
| 5,169,244 A | | 12/1992 | Siebert et al. | 384/276 |
| 5,727,885 A | | 3/1998 | Ono et al. | 384/294 |
| 6,213,221 B1 | | 4/2001 | Lewallen | 172/776 |
| 6,280,091 B1 | | 8/2001 | Martin et al. | 384/296 |
| 6,916,117 B2 | | 7/2005 | Mayer | 384/288 |
| 6,932,512 B2 | | 8/2005 | Cox et al. | 384/434 |

* cited by examiner

*Primary Examiner*—Thomas R Hannon

(57) ABSTRACT

A bearing block assembly includes a liner having a two piece ring of low friction material extending around the rockshaft and held in place by a bearing block. The rockshaft includes a radially projecting member interacting with the bearing block assembly to maintain the axial position of the rockshaft. The bearing liner includes a flange extending beyond the bearing block to contact the projecting member. The flange is seated in a groove at the side of the bearing block and lowers the coefficient of friction at the rockshaft/thrust surface interface.

18 Claims, 4 Drawing Sheets

ROCKSHAFT LINER WITH THRUST SURFACE

FIELD OF THE INVENTION

The present invention relates generally to bearing block assemblies for large rotating tubular members such as agricultural implement rockshafts and, more specifically, to wear insert structure with a thrust surface for such assemblies.

BACKGROUND OF THE INVENTION

Round steel rockshafts of tubular or solid cross section are commonly utilized to control height on implement frames and disk gang attachments. Bearing block assemblies typically support the shaft from a frame, and a hydraulic cylinder rotates the rockshaft to raise and lower the frame or gang. The bearing block assemblies include a two-piece cast iron or welded steel bearing block which allows rotation about an axis but limit movement in the direction of the axis. As the rockshaft rotates, often under very heavy loading, wear occurs between the steel rockshaft and the metallic bearing block. Although the bearing blocks often include a grease fitting for lubrication to reduce the wear, the hostile operating environment results in contamination of the lubricant with dust and sand which accelerates the wear. To purge the contaminants from between the rockshaft and bearing block, frequent over-greasing is required to discharge the contaminants. This greasing process is often inconvenient because of the location of the assemblies in hard to reach areas and is time-consuming and messy.

A further problem inherent with many bearing block assemblies for large applications such as agricultural implement lift systems is one of manufacturing tolerances of the shafts and of the cast iron or welded steel bearing blocks. A loose or sloppy fit between the mating parts resulting from the tolerances, combined with excessive wear that is commonly encountered in the hostile operating environment, can result in functional problems for the lift systems. Rotating rockshafts retained by bearing blocks have high wear points between the contact members. This wear requires maintenance at a prescribed interval to lubricate these joints to reduce the wear and maintain smooth operation.

Some implements use a one piece plastic liner to reduce wear. However, the one piece liner is difficult to replace if worn or damaged. In commonly assigned U.S. Pat. No. 6,932, 512, a two-piece wear insert is described for eliminating greasing and reducing friction between the rockshaft and bearing block. The two-piece liner is easier to replace than a one-piece liner. However, such a liner does not provide thrust protection to accommodate side loads on the rockshaft and reduce friction and noise generated from the side loads.

SUMMARY OF THE INVENTION

It is therefore an object of the present invention to provide an improved bearing block structure for agricultural implement lift systems that overcomes most or all of the above mentioned problems. It is a further object to provide such a structure with a liner that is easy to replace and yet provides thrust load protection.

It is another object of the invention to provide an improved bearing liner for an implement bearing block assembly. It is a further object to provide such a liner which is easier to replace and has improved thrust protection and noise reduction compared to most presently available bearing liners.

A bearing block assembly for an implement lift system includes a liner having a two piece ring of low friction material extending around the rockshaft and held in place by a bearing block. The rockshaft includes a radially projecting member interacting with the bearing block assembly to maintain the axial position of the rockshaft. The bearing liner includes a flange seated in a side groove of the bearing block and extending beyond the bearing block to contact the projecting member. The flange and side groove along with a central liner rib and corresponding central bearing block groove locate and support the liner in the proper position. The flange lowers the coeffiecient of friction at the rockshaft/thrust surface interface. The liner design therefore not only reduces or eliminates maintenance brought about by rotational motion and load but also protects from thrust loading along the rockshaft axis. The low friction flange also reduces thrust load noise and provides smoother rockshaft action. The low coefficient of friction of the insert material maintains smooth, quiet rockshaft operation and addresses frictional wear problems in all planes of contact at the bearing interface. The liner can be replaced easily without need to dismantle the entire lift system These and other objects, features and advantages of the present invention will become apparent from the description below in view of the drawings.

DESCRIPTION OF THE PREFERRED EMBODIMENT

Figure 1:
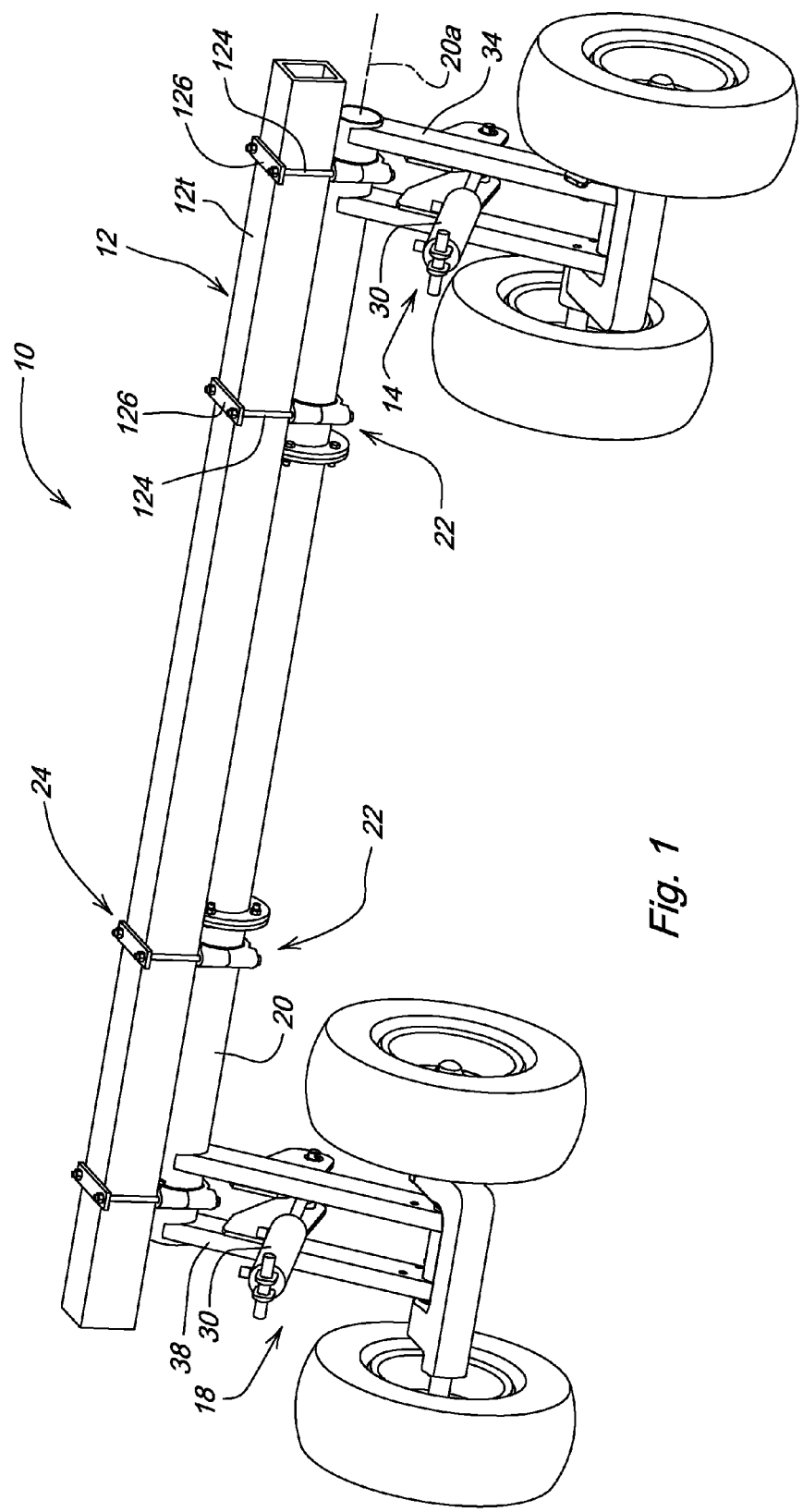
FIG. 1 is a front perspective view of a portion of an agricultural tillage or seeding implement having a lift system rockshaft with a bearing block assembly.

Referring to FIG. 1, therein is shown a portion of an agricultural tillage or seeding implement 10 having a main frame 12 supported for forward movement by lift wheel assemblies 14 and 18. A transversely extending rockshaft 20 of circular cross section is connected by bearing block assemblies 22 and bearing block connector structures 24 to a transverse main frame tube 12t of rectangular configuration. Cylinders 30 are connected to lift arms 34 and 38 of the wheel assemblies 14 and 18, respectively, for rotating the rockshaft 20 about a transverse rockshaft axis 20a and rocking the wheel assemblies 14 and 18 generally in unison to raise and lower the main frame 12.

The bearing block assemblies 22 include a first or bottom portion or half section 40 (FIG. 2) and a mating second or top portion or half section 42. The bottom and top portions 40 and 42 are generally identical in construction and include arc-shaped semi-circular cavities 50 and 52 which, when the portions 40 and 42 are connected, define a circular opening having a diameter slightly larger than the diameter of the rockshaft 20. A radially extended stepped area or flat 58 is located at each end of each of the semi-circular cavities 50 and 52 adjacent a bolt-receiving section 60 having a bolt-receiving bore 62. When the half sections 40 and 42 are joined around the rockshaft 20, the adjacent stepped areas 58 define an axially extending anti-rotation flange receiving area 64 at the joint. Each of the bearing block portions 40 and 42 includes a flat 66 centered between the bores 62. The flat 66 on the portion adjacent a face of the main frame tube 12*t* is secured against the tube 12*t* by the bearing block connector structure 24.

Figure 2:
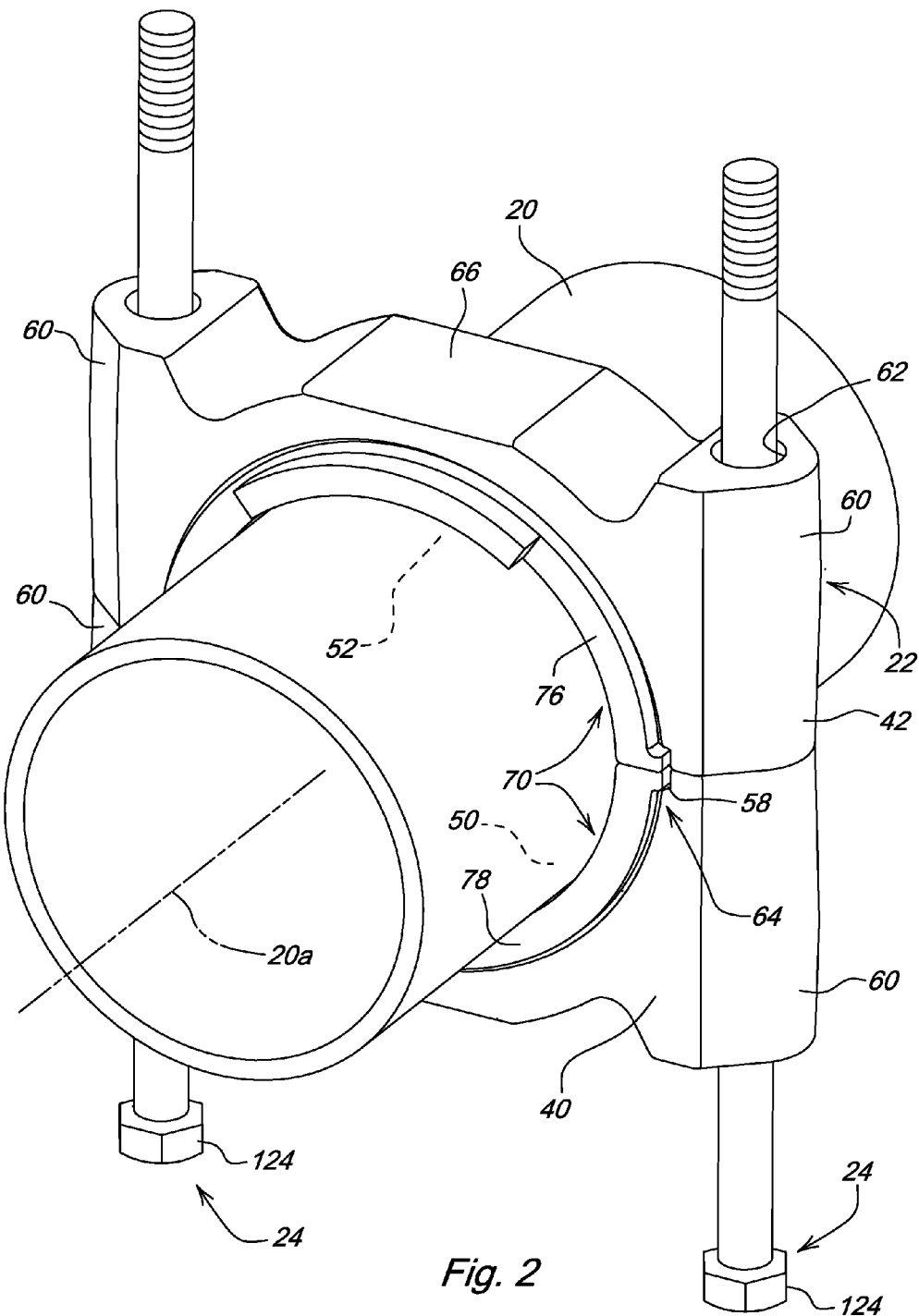
FIG. 2 is an enlarged perspective view of the bearing block assembly of FIG. 1.
Figure 3:
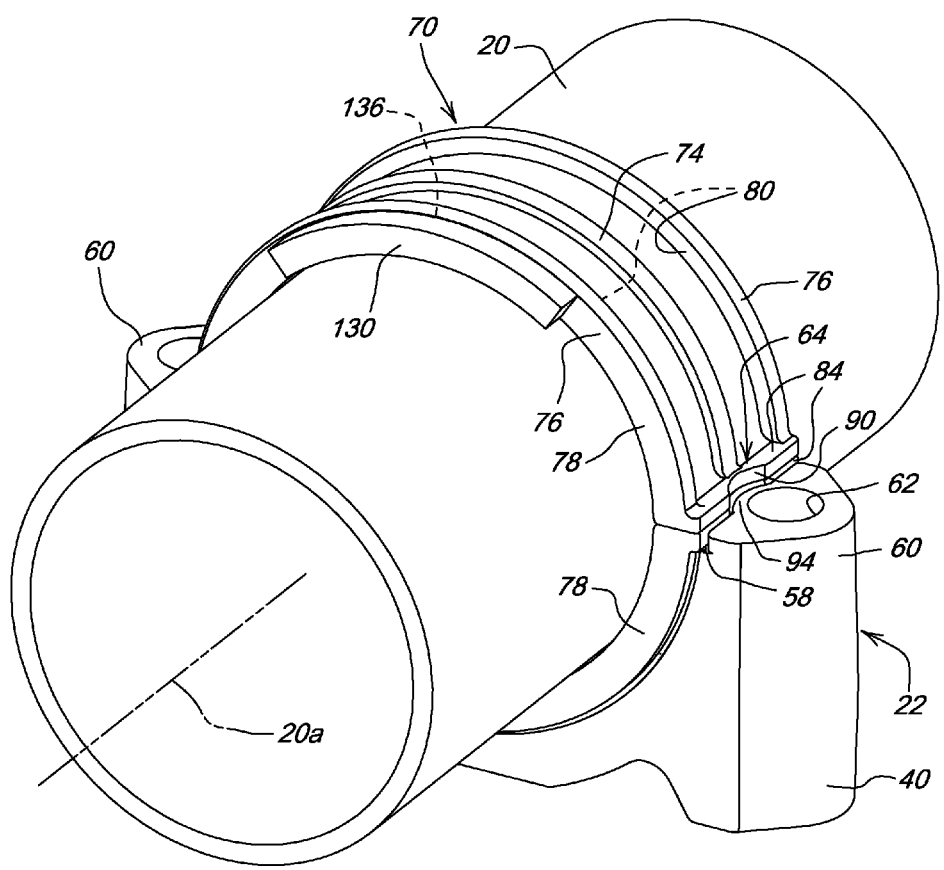
FIG. 3 is a view similar to FIG. 2 but with parts removed to better show the bearing block inserts.

The bearing block assemblies 22 include bearing block liners or wear inserts 70 which, as shown in FIGS. 2 and 3, are generally identical and have outer surfaces conforming to the shape of the semi-circular cavities 50 and 52. The inserts 70 may be fabricated from ultra high molecular weight polyethylene, and when assembled in the cavities, define a low friction cylindrical cavity of diameter approximately equal to the diameter of the rockshaft 20 and providing a bearing and support surface for the rockshaft as the rockshaft rotates about the axis 20*a*.

The wear inserts 70 include a central rib 74 (FIG. 3) and thrust flanges 76 located at the axially outermost ends of the inserts. The thrust flanges include axially outwardly facing flat wear surfaces 78 offset outwardly from the corresponding axial faces of the bearing block portions 40 and 42 and outwardly from the cavities 50 and 52. Axially inward surfaces 80 of the thrust flanges 76 bear against the sides of the portions 40 and 42 at the cavity locations.

Radially projecting anti-rotation flanges 84 extend between the opposite thrust flanges 76 at the ends of the inserts 70. The flanges 84 are connected to and extend radially outwardly from the thrust flanges 76 and the central rib 74. As best seen in FIG. 3, each pair of anti-rotation flanges 84 is received in the corresponding anti-rotation flange receiving area 64 at the joint to secure the inserts 70 in the cavities 50 and 52 and prevent rotation of the inserts relative to the bearing block assembly. The rib 74 and the flanges 76 strengthen the inserts and help secure the inserts against axial movement relative to the bearing blocks. A rounded or arc-shaped notch 90 is located in each anti-rotation flange 84 adjacent each end of the rib 74. The notch 90 conforms to a rounded wall portion 94 adjacent the bolt-receiving bore 62 and also helps to locate and secure the inserts in the cavities.

Figure 4:
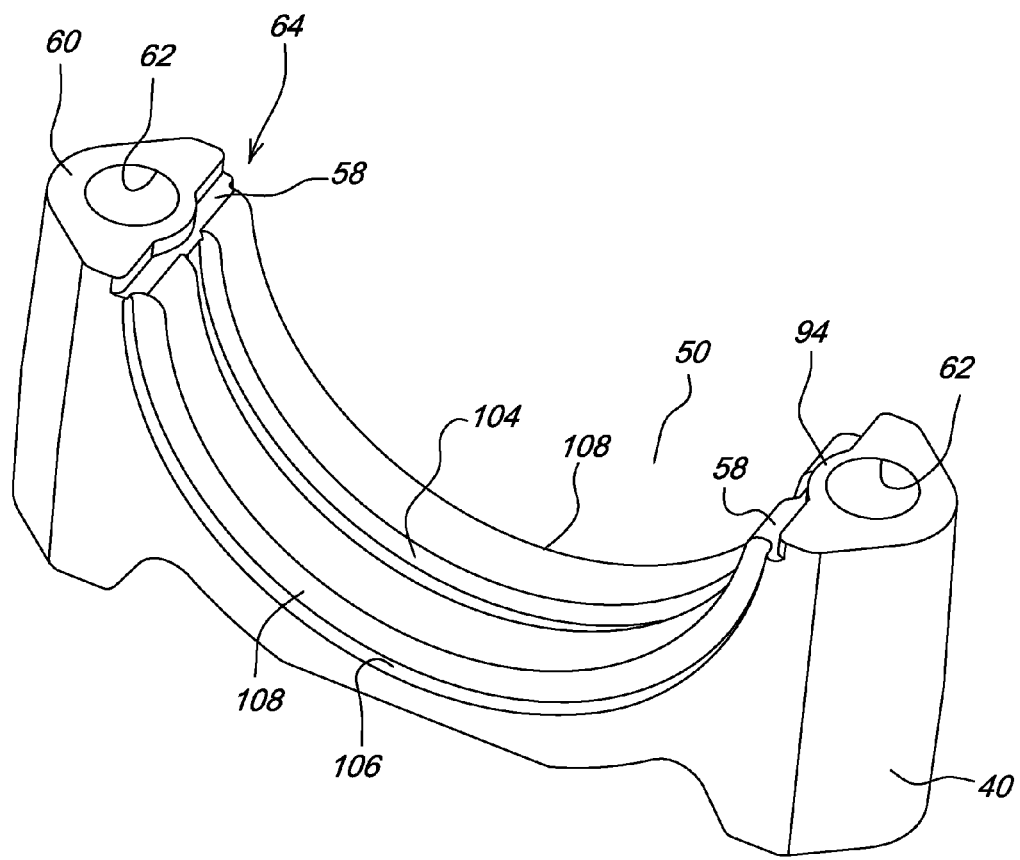
FIG. 4 is an enlarged perspective view of a portion of the bearing block assembly of FIG 1.

Referring to FIG. 4, the half section 40 (and similarly the half section 42) includes a central groove 104 conforming to and receiving the corresponding rib 74 of the insert 70. The groove 104 helps locate and contain the insert 70 within the half section 40. Semicircular flange receiving grooves 106 with outwardly directed recessed walls or faces 108 are formed in the opposite sides of the section 40, and the flange 76 is partially received within the grooves with the inwardly directed face 80 abutting the face 108 for locating and supporting the flange 76.

The wear inserts 70 and the first and second bearing block portions 40 and 42 are assembled around the rockshaft 20, and the connector structure 24 is tightened against the main frame tube 12*t* to secure the bearing block portions around the rockshaft and support the rockshaft from the frame 12. As shown, the connector structure 24 includes a bolt 124 extending through each pair of aligned bores 62. The bolts 124 extend upwardly adjacent opposite faces of the tube 12*t* and through apertures in an upper mounting plate 126. Upper threaded ends of the bolts 124 receive nuts tightened against the mounting plate 126 to secure bearing block portions 40 and 42 together around the inserts 70 and to draw the flat 66 on the portion 42 tightly against the lower face of the main frame tube 12*t*.

To replace the wear inserts 70, the operator simply loosens or removes the bolts 124 to open up the bearing block portions from around the rockshaft 124 sufficiently to remove the individual semi-circular wear inserts 70 from the cavities. New inserts 70 are then placed in the cavities 50 and 52, and the bolts 124 are tightened to rotatably secure the rockshaft 20 in position on the frame 12. Maintenance of the bearing structures therefore is relatively simple and does not require dismantling of the implement lift system.

The rockshaft 20 includes thrust structure indicated at 130 extending radially outwardly from the circular cross-section of the rockshaft. The thrust structure 130 is located adjacent the bearing block sections 40 and 42 and includes an axially inwardly facing thrust surface 136 which, when the bearing block sections are assembled around the rockshaft 20, abuts or is closely adjacent the outwardly facing flat wear surface 78 on the thrust flange 76 of the wear insert 70 (FIG. 3). The grooves 106 of the bearing block portions 40 and 42 provide backing at the edge of the opening for thrust flanges 76. The structure secures the rockshaft 20 against axial movement relative to the main frame tube 12*t*, and the wear insert thrust flange 76 protects against metal-to-metal contact under thrust loading. The low coefficient of friction of the insert material maintains smooth, quiet rockshaft operation and addresses frictional wear problems in all planes of contact at the bearing interface to reduce or eliminate bearing maintenance requirements.

Having described the preferred embodiment, it will become apparent that various modifications can be made without departing from the scope of the invention as defined in the accompanying claims.

The invention claimed is:

1. Rockshaft bearing block structure for rotatably mounting a portion of a rockshaft for an implement frame, the rockshaft having a rotational axis, a circular cross-section and a rockshaft thrust surface extending radially outwardly of the circular cross-section, the bearing block structure comprising:
   first and second bearing block sections, the sections including first and second arc-shaped cavities;
   first and second arc-shaped bearing block inserts received in the respective first and second arc-shaped cavities, the inserts rotatable mounting the rockshaft for rotation about a rockshaft axis, the inserts bearing against the circular cross section;
   wherein the bearing block inserts include a thrust flange extending axially outwardly of the bearing block sections and radially outwardly of the circular cross section;
   connector structure releasably securing the first and second bearing block sections and the inserts around the rockshaft with the thrust flange located between the thrust surface and the bearing block sections, the rockshaft thrust surface bearing against the thrust flange to limit axial movement of the rockshaft relative to the bearing block sections, the first and second bearing block sections releasable to remove the inserts from around the rockshaft without need to remove the rockshaft from the implement frame; and
   wherein the rockshaft connector structure includes a bolt-receiving bore portion, and the inserts include a notch received against the bolt-receiving bore portion.

2. The structure of claim 1 wherein the bearing block sections include a stepped portion, and the inserts include a radially projecting anti-rotation flange received by the stepped portion.

3. The structure of claim 2 wherein the notch is located in the anti-rotation flange.

4. The structure of claim 1 wherein the inserts are identical and fabricated from a wear-resistant polyethylene material.

5. The structure of claim 1 wherein the thrust flange comprises first and second semi-circular flanges connected to the first and second bearing block inserts, respectively.

6. The structure of claim 5 wherein the first and second semi-circular flanges extend substantially around the entire circular cross-section of the rockshaft when positioned in the first and second arc-shaped cavities.

7. Rockshaft bearing block structure for rotatably mounting a portion of a rockshaft for an implement frame, the rockshaft having a rotational axis, a circular cross-section and a rockshaft thrust surface extending radially outwardly of the circular cross-section, the bearing block structure comprising:

first and second bearing block sections, the sections including first and second arc-shaped cavities;

first and second arc-shaped bearing block inserts received in the respective first and second arc-shaped cavities, the inserts rotatable mounting the rockshaft for rotation about a rockshaft axis, the inserts bearing against the circular cross section;

wherein the bearing block inserts include a thrust flange extending axially outwardly of the bearing block sections and radially outwardly of the circular cross section;

connector structure releasably securing the first and second bearing block sections and the inserts around the rockshaft with the thrust flange located between the thrust surface and the bearing block sections, the rockshaft thrust surface bearing against the thrust flange to limit axial movement of the rockshaft relative to the bearing block sections, the first and second bearing block sections releasable to remove the inserts from around the rockshaft without need to remove the rockshaft from the implement frame; and wherein the connector structure includes an insert-contacting bore portion, and the inserts include an anti-rotation flange conforming to and abutting the bore portion.

8. The structure of claim 7 wherein the anti-rotation flange extends in the direction of the rockshaft axis between opposite edges of the inserts.

9. The structure of claim 8 wherein the connector structure includes a stepped portion and the anti-rotation flange abuts the stepped portion.

10. Rockshaft bearing block structure for rotatably mounting a portion of a rockshaft for an implement frame, the rockshaft having a rotational axis, a circular cross-section and a rockshaft thrust surface extending radially outwardly of the circular cross-section, the bearing block structure comprising:

first and second bearing block sections, the sections including first and second arc-shaped cavities;

first and second arc-shaped bearing block inserts received in the respective first and second arc-shaped cavities, the inserts rotatable mounting the rockshaft for rotation about a rockshaft axis, the inserts bearing against the circular cross section;

wherein the bearing block inserts include a thrust flange extending axially outwardly of the bearing block sections and radially outwardly of the circular cross section;

connector structure releasably securing the first and second bearing block sections and the inserts around the rockshaft with the thrust flange located between the thrust surface and the bearing block sections, the rockshaft thrust surface bearing against the thrust flange to limit axial movement of the rockshaft relative to the bearing block sections, the first and second bearing block sections releasable to remove the inserts from around the rockshaft without need to remove the rockshaft from the implement frame;

wherein the thrust flange comprises first and second semi-circular flanges connected to the first and second bearing block inserts, respectively; and wherein the bearing block sections include a semi-circular groove providing locating and backing for the thrust flange.

11. In a rockshaft bearing block structure for an agricultural implement frame including a rockshaft having circular cross-section and an axial thrust surface, the bearing block structure including first and second bearing block sections with first and second cavities, the bearing block sections releasably secured around the rockshaft with the axial thrust surface adjacent bearing block sections, wear insert structure comprising:

first and second bearing block inserts having outer surfaces complimentary to the first and second cavities and adapted for support therein, the bearing block inserts including inner surfaces defining a substantially cylindrical rockshaft bearing wear area when the inserts are supported in the cavity;

wherein the bearing block inserts are insertable around and removable from the rockshaft when the bearing block sections are released without removal of the rockshaft;

wherein the bearing block inserts include a contact area adapted for non-rotatably indexing the inserts relative to the bearing block structure;

wherein the bearing block inserts include a friction reducing flange extending radially outwardly of the circular cross-section of the rockshaft between the thrust surface and bearing block sections, the thrust surface bearing against the friction reducing flange as the rockshaft rotates relative to the implement frame; and wherein the cavities include an outer groove having an axially outwardly directed wall abutting an inwardly directed face of the friction reducing flange and supporting the flange with a portion of the flange projecting axially outwardly from the bearing block structure.

12. The wear insert structure as set forth in claim 11 wherein the bearing block inserts comprise identical half portions each conforming generally to the shape of a half cylinder.

13. The wear insert structure as set forth in claim 12 wherein the contact area comprises an end portion of the half portions.

14. The wear insert structure as set forth in claim 11 wherein the rockshaft has a circumference, and the friction reducing flange extends substantially the entire circumference of the rockshaft.

15. The wear insert structure as set forth in claim 11 wherein the inserts are fabricated from a polyethylene material.

16. The wear insert structure as set forth in claim 11 wherein the bearing block inserts comprise identical half-sections having axially outermost rib portions defining the friction reducing flange.

17. In a rockshaft bearing block structure for an agricultural implement frame including a rockshaft having circular cross-section and an axial thrust surface, the bearing block structure including first and second bearing block sections with first and second cavities, the bearing block sections releasably secured around the rockshaft with the axial thrust surface adjacent bearing block sections, wear insert structure comprising:

first and second bearing block inserts having outer surfaces complimentary to the first and second cavities and adapted for support therein, the bearing block inserts including inner surfaces defining a substantially cylindrical rockshaft bearing wear area when the inserts are supported in the cavity;

wherein the bearing block inserts are insertable around and removable from the rockshaft when the bearing block sections are released without removal of the rockshaft;

wherein the bearing block inserts include a contact area adapted for non-rotatably indexing the inserts relative to the bearing block structure; and wherein the bearing block inserts include a friction reducing flange extending radially outwardly of the circular cross-section of the rockshaft between the thrust surface and bearing block sections, the thrust surface bearing against the friction reducing flange as the rockshaft rotates relative to the implement frame;

wherein the bearing block inserts comprise identical half portions each conforming generally to the shape of a half cylinder; and further comprising anti-rotation structure adapted for support between the bearing block sections within the cavities and having a ledge portion with a notch conforming to the shape of the block sections adjacent the ledge portion, the notch locating the bearing block inserts in a direction parallel to an axis of rotation of the rockshaft.

18. In a rockshaft bearing block structure for an agricultural implement frame including a rockshaft having circular cross-section and an axial thrust surface, the bearing block structure including first and second bearing block sections with first and second cavities, the bearing block sections releasably secured around the rockshaft with the axial thrust surface adjacent bearing block sections, wear insert structure comprising:

first and second bearing block inserts having outer surfaces complimentary to the first and second cavities and adapted for support therein, the bearing block inserts including inner surfaces defining a substantially cylindrical rockshaft bearing wear area when the inserts are supported in the cavity;

wherein the bearing block inserts are insertable around and removable from the rockshaft when the bearing block sections are released without removal of the rockshaft;

wherein the bearing block inserts include a contact area adapted for non-rotatably indexing the inserts relative to the bearing block structure;

wherein the bearing block inserts include a friction reducing flange extending radially outwardly of the circular cross-section of the rockshaft between the thrust surface and bearing block sections, the thrust surface bearing against the friction reducing flange as the rockshaft rotates relative to the implement frame; and wherein the bearing block inserts further comprise a central rib extending circumferentially between the rib portions, and a radial ledge portion connecting the ribs and extending radially outwardly of the ribs, wherein the ledge portion defines the contact area non-rotatably indexing the inserts.

* * * * *